(12) United States Patent
Nobis

(10) Patent No.: US 6,691,062 B1
(45) Date of Patent: Feb. 10, 2004

(54) METHOD AND APPARATUS FOR ASSESSING THE PLAY IN BEARINGS OR JOINTS OF COMPONENTS COUPLED TO ONE ANOTHER

(75) Inventor: Guenter Nobis, Wendlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/110,710

(22) PCT Filed: Oct. 12, 2000

(86) PCT No.: PCT/DE00/03588

§ 371 (c)(1),
(2), (4) Date: Jul. 23, 2002

(87) PCT Pub. No.: WO01/29503

PCT Pub. Date: Apr. 26, 2001

(30) Foreign Application Priority Data

Oct. 15, 1999 (DE) .......................................... 199 49 704

(51) Int. Cl.[7] ............................................... G01B 11/00
(52) U.S. Cl. ................... 702/159; 702/150; 356/139.09
(58) Field of Search ................................ 702/150, 151, 702/152, 153, 154, 159, 148, 149, 141, 142; 356/138, 139.03, 139.09, 155, 203.18

(56) References Cited

U.S. PATENT DOCUMENTS

| | | | |
|---|---|---|---|
| 4,798,461 A | 1/1989 | Pavlin et al. | |
| 5,535,522 A | 7/1996 | Jackson | |
| 5,600,435 A | 2/1997 | Bartko et al. | |
| 6,397,164 B1 * | 5/2002 | Nobis et al. | ................. 702/150 |
| 6,404,486 B1 * | 6/2002 | Nobis et al. | ........... 356/139.09 |

FOREIGN PATENT DOCUMENTS

| | | |
|---|---|---|
| DE | 37 08 295 C | 8/1988 |
| DE | 197 57 760 A | 7/1999 |
| WO | WO 99 23464 A | 5/1999 |
| WO | WO 99 60368 A | 11/1999 |

* cited by examiner

Primary Examiner—Bryan Bui
(74) Attorney, Agent, or Firm—Ronald E. Greigg

(57) ABSTRACT

A method and an apparatus for assessing the play in bearings or joints of components coupled to one another, in particular wheel suspension or steering components of a motor vehicle. A simple automatic detection of the play is performed by providing that the components are subjected to alternating forces, and their positions at various times and/or their motions are detected optically, directly or indirectly, and from the detected position and/or motion data, a statement about the play is derived.

29 Claims, 1 Drawing Sheet

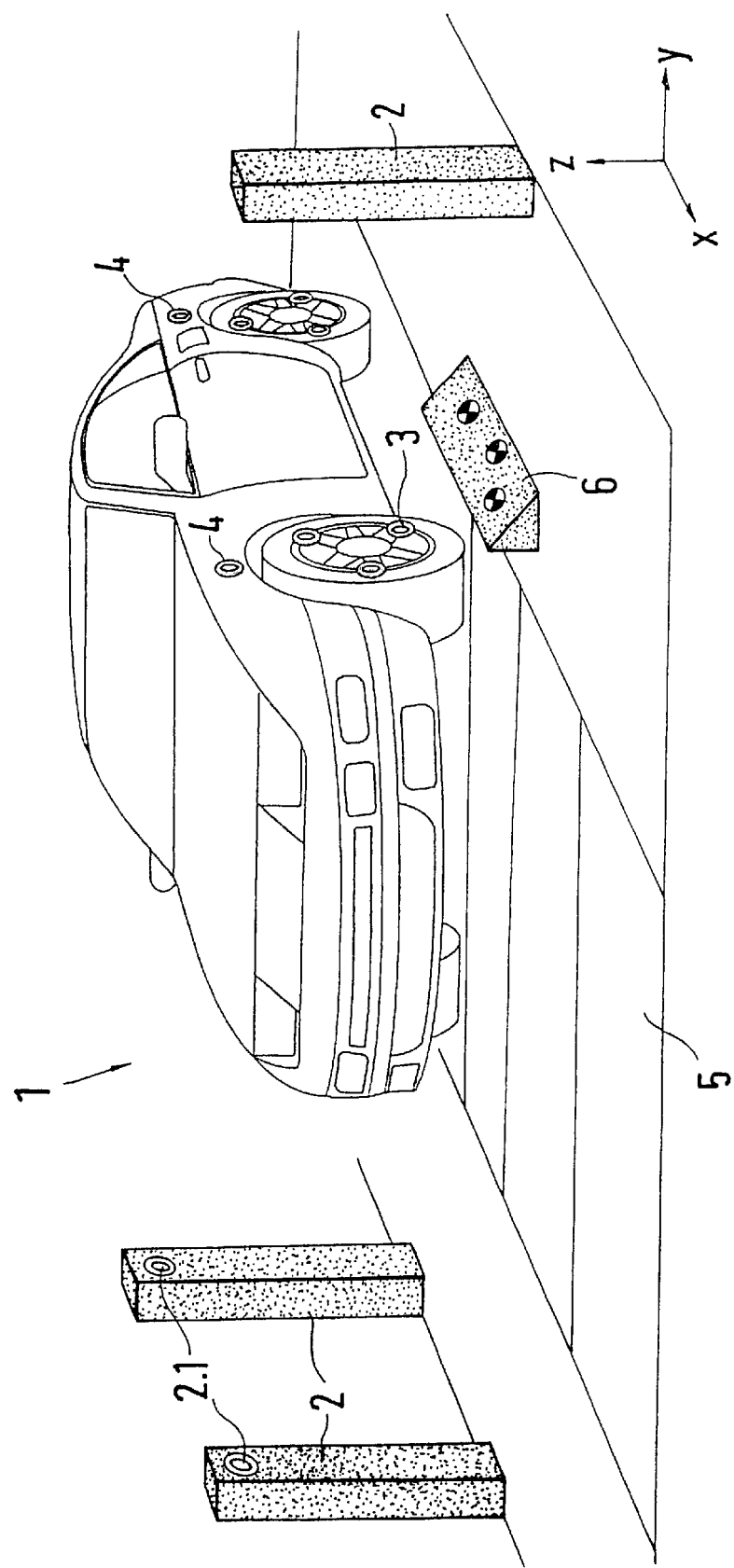

METHOD AND APPARATUS FOR ASSESSING THE PLAY IN BEARINGS OR JOINTS OF COMPONENTS COUPLED TO ONE ANOTHER

CROSS-REFERENCE TO RELATED APPLICATIONS

This application is a 35 U.S.C. 371 application of PCT/DE 00/03588, Filed on Oct. 12, 2000.

BACKGROUND OF THE INVENTION

1. Field of the Invention

This invention relates to a method and an apparatus for assessing the play in bearings of joints of components coupled to one another, in particular wheel suspension or steering components of a motor vehicle, in which the components are subjected to alternating forces.

2. Description of the Prior Art

Such a method and an apparatus intended for it is provided for instance in a test apparatus for primary examination of the technical status of motor vehicles. To monitor the bearing plays and joint plays in the components of the wheel suspension and the steering, the wheels to be tested are driven on a platform that is usually pneumatically actuated. By means of this platform, by manual tripping of the pneumatics, a force is exerted via the tires on a vehicle wheel transversely to the travel direction.

Because of the existing bearing and joint plays, displacements occur among the components, which are observed visually. The tester then makes a subjective assessment of good or bad, based on his own experience, and at the same time this assessment forms the basis for deciding whether maintenance work has to be done.

It is furthermore known, for measuring individual plays in bearings and joints, to use known methods of length-measuring technology, such as meters or gauges. The components are displaced counter to one another by the exertion of defined forces in alternating force directions. One problem of these methods is mounting measuring elements on the components that have play, which makes these measuring methods difficult to employ in practice.

It is the object of the invention to furnish a method and an apparatus of the type referred to at the outset with which the assessment of the play in bearings and joints can be done simply and automatically.

SUMMARY OF THE INVENTION

In the method, it is provided that the positions of the components at various times and/or their motions are ascertained optically either directly or indirectly (on the basis of further parts connected to them), and from the position and/or motion data, a statement about the play is derived. In the apparatus, it is provided that at the two components coupled to one another, optically detectable features are disposed or present directly or on further components in communication with them; and that an optical measuring instrument with a picture-taking system for detecting the features during their motion and with an evaluation device for ascertaining the play from the position of the components or from their motion is provided. In this way, the locations of the components and their motion are determined objectively, and from the measurement data, for instance on the basis of the various position patterns of the components at various times or from the motion patterns, the play is ascertained. In the evaluation, the initiated forces and their changes can also be taken into account. In this way, unambiguous statements regarding the play and an objective good/bad assessment are obtained.

The method can be performed for instance at a testing site that is also used to determine the wheel and axle geometry, as described for instance in German Patent Disclosures DE 197 57 763 A1 and DE 197 57 760 A1, but the introduction of the alternating forces must be done, and the motion of the coupled components or their position images must be taken into account in the evaluation. By measuring the wheel motion relative to the vehicle body, or by measuring the change in wheel position (axle geometry), a measurement of the total plays of the wheel suspension components or the steering components is possible.

One suitable procedure for this purpose is that simultaneously, image data from either a reference feature arrangement and a wheel or a reference feature arrangement and at least one part of a vehicle body or of the wheel and at least one part of the body, or all three objects are detected in such quick succession that the motions of the body and/or the wheel are resolved; that the motion of the wheel and/or the body is determined from the image data; and that the play is determined as a total play from a measurement of a wheel motion relative to the body or by measurement of the change in wheel position.

For further improvement in the accuracy of the play measurement, it is advantageous if the wheels of one axle are measured chronologically synchronously.

The measurement of the play can be performed simply, for instance by providing that the optical detection and the introduction of the alternating forces are effected during vehicle travel. The change in motion can be effected here by braking and acceleration actions or turns of the steering wheel to the right and left or by a suitable design of the roadway or by external excitations of the wheels.

Alternatively, the measurement or assessment of the play can be done in such a way that the optical detection and introduction of the alternating forces are effected with the vehicle at a stop; to generate the forces, turns of the steering wheel in opposite directions are performed, or a force-introducing device known per se is used.

As the force-introducing device, in a primary examination, a pneumatically actuated platform is for instance usual as a surface for the wheels to stand on.

To improve the assessment of the steering play, it is also an advantageous provision that to ascertain the steering play at the wheel, in addition the steering angle at the steering wheel is detected electronically or optically with a device known per se and is included in the evaluation.

With the provisions recited, objective measurement values are obtained, as a result of which the necessity for performing repairs can also be assessed objectively and imparted to the vehicle owner.

The method and the apparatus make a one-dimensional (for instance, axial play), two-dimensional (for instance, bearings out of true, radial play) or a three-dimensional play measurement possible within one measuring operation, while in a subjective visual assessment essentially only a single-dimensional detection of play is possible.

The method makes it possible to measure the effects of the existing bearing or joint plays on the vehicle wheel or the wheel position that occur under normal conditions of vehicle use (during vehicle travel) or under special test conditions (for instance by introducing defined forces using a pneumatically actuated platform). Thus the influences of bearing and joint plays in a specific vehicle that are relevant to wheel wear and driving safety are detected by measurement technology.

If the play measurement is performed in conjunction with another optical testing method using an optical picture-taking system, in particular cameras, for instance an optical axle measurement, then the apparatus can be used in multiple ways, making the additional expense slight.

BRIEF DESCRIPTION OF THE DRAWINGS

The invention will be described below in terms of an exemplary embodiment, in conjunction with the single drawing FIGURE which shows a testing site incorporating the invention.

DESCRIPTION OF THE PREFERRED EMBODIMENT

The testing site includes an apparatus 1 for assessing the play of bearings or joints of wheel suspension or steering components of a motor vehicle. On a testing site floor 5, the apparatus 1 has a reference feature arrangement 6 and picture-taking systems 2, installed on the sides, with picture-taking devices 2.1, in particular cameras. The motor vehicle is provided with vehicle body features 4 on its body in the vicinity of the wheels and with wheel features 3 on the wheels.

With the picture-taking system 2, which is in communication with an evaluation device or itself has an evaluation device, it is possible in rapid image order, by evaluation of the location of the wheel features and the vehicle body features, to ascertain the various wheel positions and body positions or the motions of at least one wheel or of the body, and from the obtained location or motion data, under the influence of alternating forces, which are generated for instance by accelerations or braking operations or turns of the steering wheel in different directions during vehicle travel or by suitable design of the roadway or by external excitations of the wheel, to be measured. The alternating forces themselves can be included in the evaluation. It is also possible for the motions of both wheels of one axle, for instance, to be detected chronologically synchronously and compared with one another to improve the outcomes of measurement.

The use of this apparatus 1 with the picture-taking system 2 for determining the play between the components during vehicle travel makes it possible summarily to detect all the bearing and joint plays under the influence of the alternating forces as a consequence of the changes in motion. Because of the existing bearing and joint plays, changes in the wheel geometry occur, which are detected by measurement technology with the apparatus 1. With the chronologically synchronous measurement of the wheels of one axle, differences between the right and left wheel of the axle can be detected under identical operating conditions and taken into account in the assessment.

In ascertaining the steering play at the wheel, an additional improvement in accuracy is possible because in addition the steering angle is detected electronically, for instance with already known devices, and included in the evaluation. Alternatively, the detection of the steering angle at the steering wheel can also be done optically with an additional camera.

For exerting the alternating forces in the measurement of the total play, a known force-introducing device (for instance, a pneumatically actuated platform on which the vehicle stands) can be used. Then the change in wheel position that occurs as a consequence of the alternating load is detected. Advantageously, the wheels of one axle can be evaluated synchronously under identical load conditions.

A further variant of the method comprises measuring the play in individual bearings or joints. To that end, the pairs of components to be tested are marked, prior to the measurement, for instance by placing suitable measuring marks on the components, in order to detect their relative motion under the influence of alternating load optically and evaluate it by measurement technology. Instead of special measuring marks, simple colored markings can be used, or characteristic component features that are detectable by known methods of image processing can be evaluated.

A plurality of bearings and joints can be measured simultaneously, if they are within viewing range of the at least one camera. Here as well, the alternating load can be brought about by means of special testing conditions (such as a turn of the steering wheel, or platform motion).

The measurement can also be done in stationary machines, for example, under the alternating loads that occur in normal conditions of use.

If the play in the bearing or joint occurs in only one plane of motion, then it suffices to use only one camera for the optical measurement. Here as well it is possible to measure a plurality of bearings and joints simultaneously, if they are detected as images by a camera and their planes of motion are either parallel to one another, or their angular position relative to one another is known to the measurement system.

For detecting multiple degrees of freedom of the play for instance linear (axial play), in a plane (bearing play) or rotationally (steering wheel play)—an observation of the paired components to be tested, or parts coupled to them, is made from different perspectives, by means of two cameras, for instance. For simple automatic ascertainment of the positioning of the cameras in each case, a reference feature arrangement 6 known to the picture-taking system can be provided on the testing site, as described in the references referred to at the outset, DE 197 57 763 A1 and DE 197 57 760 A1. With a calibrated reference feature arrangement 6, it is simultaneously possible in a simple way to obtain absolute measurement data. For deriving absolute measured values, factory calibration of the picture-taking system then becomes unnecessary.

The foregoing relates to preferred exemplary embodiments of the invention, it being understood that other variants and embodiments thereof are possible within the spirit and scope of the invention, the latter being defined by the appended claims.

What is claimed is:

1. A method for assessing the play in bearings or joints of components coupled to one another, in which the components are subjected to alternating forces, and a statement about the play is derived from an optical detection during the motion of the components, the method comprising:

detecting the positions of the components at various times and/or their motions directly or indirectly as images by means of at least one camera, and evaluating the image data and deriving a statement about the play from the detected position and/or motion data.

2. The method of claim 1 wherein the components are wheel suspension or steering components of a vehicle;

and wherein the method further comprises simultaneously obtaining image data from either a reference feature arrangement and a wheel, or a reference feature arrangement and at least one part of a vehicle body, or of the wheel and at least one part of the body, or detecting all three objects in such quick succession that the motions of the body and/or the wheel are resolved;

determining the motion of the wheel and/or the body from the image data; and determining the play as a total play from a measurement of a wheel motion relative to the body or by measurement of the change in wheel position.

3. The method of claim 2, wherein the wheels of one axle are measured chronologically synchronously.

4. The method of claim 3 wherein the optical detection and the introduction of the alternating forces are effected during vehicle travel.

5. The method of claim 3 wherein the optical detection and introduction of the alternating forces are effected while the vehicle is stationary stopped, and to generate the forces, either turns of the steering wheel in opposite directions are performed, or a separate force-introducing device is used.

6. The method of claim 2 wherein the optical detection and the introduction of the alternating forces are effected during vehicle travel.

7. The method of claim 6, wherein the introduction of the alternating forces is effected by accelerations and braking operations or turns of the steering wheel in opposite directions, or by suitable design of the roadway, or by external excitations of the wheels.

8. The method of claim 2 wherein the optical detection and introduction of the alternating forces are effected while the vehicle is stationary, and to generate the forces, either turns of the steering wheel in opposite directions are performed, or a separate force-introducing device is used.

9. The method of claim 2 wherein to ascertain the steering play at the wheel, the steering angle at the steering wheel is detected electronically or optically and that information is included in the evaluation.

10. The method of claim 1 wherein the optical detection and the introduction of the alternating forces are effected during vehicle travel.

11. The method of claim 10, wherein the introduction of the alternating forces is effected by accelerations and braking operations or turns of the steering wheel in opposite directions, or by suitable design of the roadway, or by external excitations of the wheels.

12. The method of claim 11 wherein to ascertain the steering play at the wheel, the steering angle at the steering wheel is detected electronically or optically and that information is included in the evaluation.

13. The method of claim 1 wherein the optical detection and introduction of the alternating forces are effected while the vehicle is stationary, and to generate the forces, either turns of the steering wheel in opposite directions are performed, or a separate force-introducing device is used.

14. The method of claim 13 wherein to ascertain the steering play at the wheel, the steering angle at the steering wheel is detected electronically or optically and that information is included in the evaluation.

15. The method of claim 1 wherein to ascertain the steering play at the wheel, the steering angle at the steering wheel is detected electronically or optically and that information is included in the evaluation.

16. The method of claim 1 wherein for measuring play in individual bearings or joints, the components to be tested are provided with a measuring marking prior to the optical measurement, or component features that are already present on the components are detected; and that the relative motion or position of the components to one another is ascertained.

17. An apparatus for assessing the play of bearings or joints of components which are coupled to one another, comprising:

optically detectable features (3, 4) on the components which are coupled to one another, or on further components in communication with them; and an optical measuring instrument with a picture-taking system (2) for detecting the features during their motion and with an evaluation device for ascertaining the play of the components with respect to each other from the position of the components or from their motion.

18. The apparatus of claim 17, wherein the components are wheel suspension or steering components of a vehicle;

the picture-taking system (2) is arranged for detecting wheel features (3) of at least one wheel and vehicle body features (4) of at least one adjacent part of the vehicle body (4) during vehicle travel, or that the picture-taking system is arranged to detect the wheel features (3) of at least one wheel and vehicle body features (4) of at least one adjacent part of the vehicle body, or features placed on the components.

19. The apparatus of claim 18 wherein the apparatus further comprising means, for additionally detecting a steering angle.

20. The apparatus of claim 18 wherein the apparatus further comprising a force-introducing device for subjecting at least one of the components directly or indirectly to alternating forces.

21. The apparatus of claim 18 wherein the apparatus further comprises a stationary reference feature (6) the stationary reference feature (6) being included in the derivation of measurement data.

22. The apparatus of claim 17 wherein the apparatus further comprising means, for additionally detecting a steering angle.

23. The apparatus of claim 22 wherein the apparatus further comprising a force-introducing device for subjecting at least one of the components directly or indirectly to alternating forces.

24. The apparatus of claim 22 wherein the apparatus further comprises a stationary reference feature (6) the stationary reference feature (6) being included in the derivation of measurement data.

25. The apparatus of claim 17 wherein the apparatus further comprising a force-introducing device for subjecting at least one of the components directly or indirectly to alternating forces.

26. The apparatus of claim 25 wherein the apparatus further comprises a stationary reference feature (6) the stationary reference feature (6) being included in the derivation of measurement data.

27. The apparatus of claim 17 wherein the apparatus further comprises a stationary reference feature (6)

the stationary reference feature (6) being included in the derivation of measurement data.

28. A method for assessing the play in bearings or joints of components, which play is generated by subjecting the components to alternating forces, and generating a statement about the play during the motion of the components, the method comprising the steps of:

detecting the positions of the components at various times and/or their motions directly or indirectly as images by means of at least one camera, subjecting the components to alternating forces during the detecting step, and evaluating the image data and deriving a statement about the play from the information gathered during the detecting step.

29. An apparatus for assessing the play of bearings or joints of components which are coupled to one another, comprising:

optically detectable features (3, 4) on the components which are coupled to one another, or on further components in communication with them;

an optical measuring instrument for detecting the features and their relative positions during their motion; and an evaluation device for ascertaining the play of the components with respect to each other from the relative positions of the features of the components, or from the relative motion of the features of the components.

* * * * *